US007795873B2

(12) United States Patent
Ziolkowski et al.

(10) Patent No.: US 7,795,873 B2
(45) Date of Patent: Sep. 14, 2010

(54) METHOD FOR ATTENUATING AIR WAVE RESPONSE IN MARINE ELECTROMAGNETIC SURVEYING

(75) Inventors: Antoni Marjan Ziolkowski, Edinburgh (GB); David Allan Wright, North Berwick (GB)

(73) Assignee: MTEM Ltd, Edinburgh (GB)

( * ) Notice: Subject to any disclaimer, the term of this patent is extended or adjusted under 35 U.S.C. 154(b) by 0 days.

(21) Appl. No.: 12/218,424

(22) Filed: Jul. 15, 2008

(65) Prior Publication Data
US 2010/0013486 A1    Jan. 21, 2010

(51) Int. Cl.
*G01V 3/00* (2006.01)
(52) U.S. Cl. ....................................... 324/365
(58) Field of Classification Search ................. 324/365
See application file for complete search history.

(56) References Cited

U.S. PATENT DOCUMENTS

| 6,914,433 | B2 | 7/2005 | Wright et al. | |
|---|---|---|---|---|
| 7,400,977 | B2 * | 7/2008 | Alumbaugh et al. | 702/7 |
| 2006/0203613 | A1 | 9/2006 | Thomsen et al. | |

FOREIGN PATENT DOCUMENTS

| CA | 2 643 057 | 8/2008 |
|---|---|---|
| GB | 2 412 739 | 10/2005 |
| WO | WO 03/023452 | 3/2003 |
| WO | WO 03/100467 | 12/2003 |
| WO | WO 2004/109338 | 12/2004 |
| WO | WO 2005/010560 | 2/2005 |
| WO | WO 2006/000538 | 1/2006 |
| WO | WO 2007/104949 | 9/2007 |
| WO | WO 2008/008124 | 1/2008 |
| WO | WO 2008/023194 | 2/2008 |

OTHER PUBLICATIONS

Chester J. Weiss, (2007), "The fallacy of the "shallow-water problem" in marine CSEM exploration", Geophysics, vol. 72, No. 6, pp. A93-A97.
A. Ziolkowski, D. Wright, (2007)"Removal of the airwave in shallow-marine transient EM data", 2007 SEG 75th Conference & Exhibition—San Antonio USA, pp. 534-538.
David Andreis, Lucy MacGregor (2007), "Time domain versus frequency domain CSEM in shallow water", 2007 SEG 75th Conference & Exhibition—San Antonio USA, pp. 643-647.

(Continued)

*Primary Examiner*—Reena Aurora
(74) *Attorney, Agent, or Firm*—E. Eugene Thigpen; Shannon Powers; Richard A. Fagin

(57) ABSTRACT

A method for measuring the electromagnetic response of formations below the bottom of a body of water includes positioning at least one electromagnetic transmitter and at least one electromagnetic receiver in the body of water each at a selected depth below the water surface. A transient electric current is passed through the at least one transmitter. An electromagnetic signal is detected at the at least one electromagnetic receiver. The depths are selected so that substantially all electromagnetic response to the current passed through the transmitter from the air above the body of water in the detected electromagnetic signal occurs before the beginning of a response originating in the formations below the water bottom.

7 Claims, 2 Drawing Sheets

OTHER PUBLICATIONS

D. Andreis, L. MacGregor, Tomlinson (2006), "Controlled Source Electromagnetic Imaging in Shallow Water—A Case Study", SPE, $68^{th}$ European Association of Geoscientists and Engineers Conference and Exhibition, Conference Proceeding, Vienna Austria, 41-45.

K. Schneiderbauer, Examiner, International Search Report, Oct. 30, 2009.

Madsen, K., "Modelling study of the airwave contribution to the CSEM signal", 2006, 68th Conference & Exhibition—Vienna, Austria, Jun. 12-15, 2006, P062, 5 pages.

Weidelt, P., "The airwave and resistive-layer wave in marine CSEM", 2006, 18th IAGA Workshop on Electromagnetic Induction in the Earth, S11-2, pp. 1-11.

Ziolkowski, A., and Wright, D., "Removal of the airwave in shallow-marine transient EM data", 2007, SEG 75th Conference & Exhibition—San Antonio USA, pp. 534-538.

* cited by examiner

METHOD FOR ATTENUATING AIR WAVE RESPONSE IN MARINE ELECTROMAGNETIC SURVEYING

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a method for removing an undesirable response called the "airwave" from marine electromagnetic survey data.

2. Description of the Related Art

Porous subsurface sedimentary rock formations are typically saturated with fluids as a result of having been deposited in a body of water during sedimentation. As a result, the fluids were initially entirely water. In some subsurface formations the water in the pore spaces has been displaced to some extent after sedimentation by hydrocarbons such as oil and gas. Thus, in some present day subsurface formations, the fluids in their pore spaces may be water, gas or oil, or mixtures of the foregoing.

Detection of formations having less than fully water-saturated pore space, that is, when oil or gas is present in the pore spaces, is of significant economic interest. Certain techniques for detection of such formations include determining existence of electrical resistivities in the subsurface that are anomalously high. The principle of such detection is based on the fact that the flow of electric current through a porous rock formation is related to the fractional volume of the pore spaces with respect to the total rock volume, the spatial configuration of the pore spaces and the electrical properties of the fluids filling the pore spaces. Brine-saturated porous rock formations, for example, are typically much less resistive than the same rock formations having hydrocarbons in some or all of the pore spaces, because brine is a relatively good electrical conductor while hydrocarbons are typically good electrical insulators.

Various techniques for measuring the electrical resistivity of subsurface rock formations are known in the art, for example, transient controlled source electromagnetic survey techniques such as described in International Patent Application Publication No. WO 03/023452, the contents of which are incorporated herein by reference. Such techniques in general include imparting an electromagnetic field into the subsurface and measuring electric and/or magnetic fields induced in the subsurface in response to the imparted electromagnetic field. For such measurement techniques, the electromagnetic field may be imparted using an electric field transmitter, for example, a device configured to pass an electric current through a dipole electrode. Alternatively a magnetic field transmitter may be used, for example, a device configured to pass an electric current through a wire loop or a plurality of such loops. The receivers used to detect the responsive electromagnetic fields may be, for example, dipole electrodes for measuring potential differences (electric field potential), or may be wire loops, pluralities of wire loops or magnetometers for measuring magnetic field amplitude and/or the time derivatives of magnetic field amplitude.

In transient controlled source electromagnetic surveying, the electric current passed through the transmitter to impart the electromagnetic field may be controlled to provide one or more step changes in the current amplitude. Step change in the transmitter current induces what are referred to as "transient" electromagnetic fields, and the responses measured by the receivers are related to transient response of the formations in the earth's subsurface. Step change in the transmitter current may be obtained by switching the current on, switching the current off, reversing polarity, or combinations of the foregoing. A particularly advantageous form of transmitter current switching configuration used to impart a controlled source electromagnetic field is a so called "pseudo-random binary sequence" (PRBS).

A typical marine electromagnetic survey system includes a controllable current source disposed on a survey vessel or auxiliary vessel. The vessel tows a transmitter cable on or near the water bottom for transmitting an electromagnetic field into the formations below the water bottom by passing transient current between two electrodes disposed on the transmitter. The electromagnetic response of the system including the water and the formations below the water bottom is measured by receivers disposed on a cable on or near the water bottom. The receivers may be pairs of electrodes configured such that each receiver measures the potential difference between its pair of electrodes. All the electrodes are typically in the same vertical plane. In some survey systems, different vessels may be used to tow the transmitter and the receivers to enable the transmitter-receiver separation ("offset") to be more readily adjusted. As described in the WO 03/023452 publication referred to above, the signals in the receivers are measured, as well as the signal transmitted by the transmitter. By deconvolving the measured receiver signal with the measured transmitter signal, the impulse response of the subsurface for the particular transmitter-receiver configuration is obtained.

As a practical matter, the electromagnetic signal generated by the transmitter can follow three general transmission paths to the receiver(s), these paths being through the formations below the water bottom, through the water layer itself and through the air above the water layer. In deep water, for example 2 km or more, and wherein the transmitter and receivers are disposed near the water bottom as is typical in known survey techniques, the part of the signal propagating through the air has a negligible impact on the signals detected by the receiver(s) because the electromagnetic signal from the transmitter is substantially attenuated and delayed in time from the time of the transient current event as it moves to the water surface and returns to the receiver(s) on the water bottom. By contrast, in shallow water, for example 100 m or less, the portion of the signal that moves through the water is substantial with respect to the total measured signal. Shallow water electromagnetic surveying has been thought to be impracticable as a result.

SUMMARY OF THE INVENTION

A method for measuring the electromagnetic response of formations below the bottom of a body of water according to one aspect of the invention includes positioning at least one electromagnetic transmitter and at least one electromagnetic receiver in the body water each at a selected depth below the water surface. A transient electric current is passed through the at least one transmitter. An electromagnetic signal is detected at the at least one electromagnetic receiver. The depths are selected so that substantially all electromagnetic response to the current passed through the transmitter from the air above the body of water in the detected electromagnetic signal occurs before the beginning of a response originating in the formations below the water bottom.

Other aspects and advantages of the invention will be apparent from the following description and the appended claims.

DETAILED DESCRIPTION

As explained in the Background section herein, in transient electromagnetic surveying, an electric or magnetic field resulting from one or more step changes in transmitter current is imparted into the earth's subsurface, and a response to the imparted transient electromagnetic field is measured. The measurement can be of induced voltage, magnetic field or combinations thereof. The complete impulse response is obtained by deconvolving the measured transient response for the measured transient transmitter current.

Figure 1:
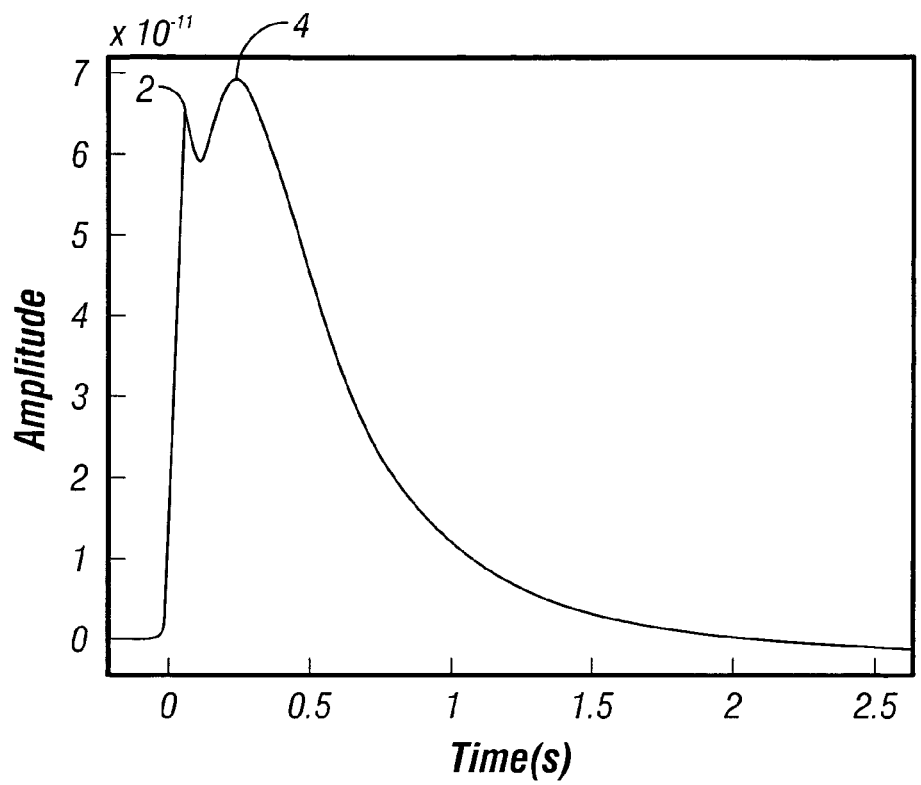
FIG. 1 shows an example transient response in a marine environment.

FIG. 1 shows an example of an actual marine total impulse response from the North Sea with water depth about 100 m and source-receiver separation 2 km. An initial amplitude peak 2 occurring just after the current switching event is the air wave. A second, slightly larger peak 4 at about 0.25 s after the current switching event is from the subsurface response. The total response is the sum of the air wave and the subsurface response.

Figure 2:
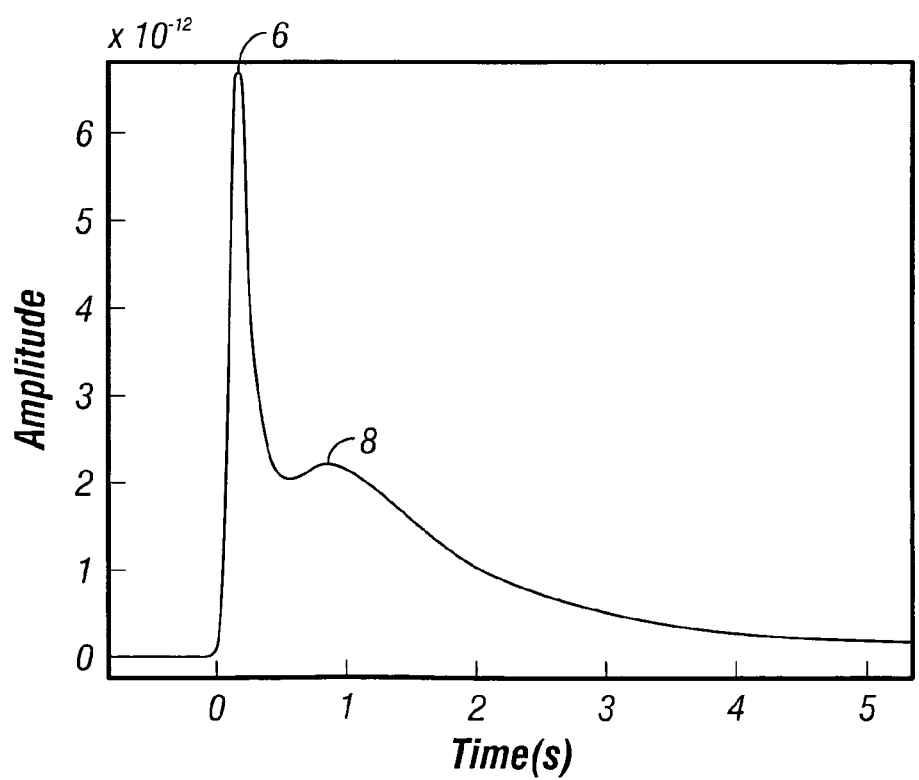
FIG. 2 shows another example transient response in a marine environment.

FIG. 2 shows another example of a total impulse response from the North Sea, with water depth about 100 m and source-receiver separation 4 km. The initial peak 6 at about 0.1 s is the air wave. The second, smaller peak 8 at about 0.9 s is from the earth impulse response.

Figure 3:
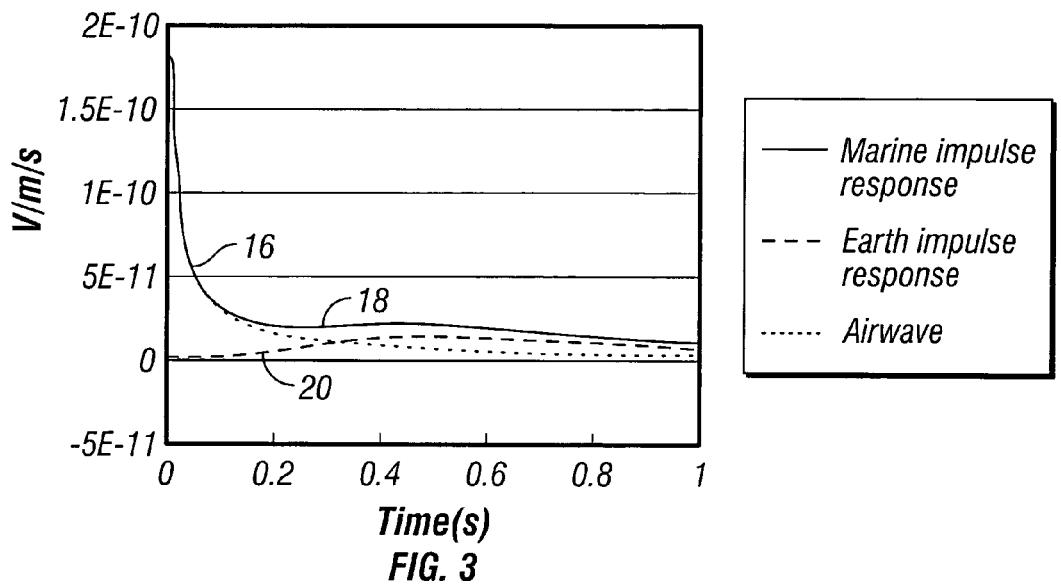
FIG. 3 shows an example decomposition of a marine transient response.

Also as explained in the Background section herein, a particular consideration in designing a marine electromagnetic survey is the water depth. For marine electromagnetic survey techniques known in the art in which the transmitters and the receivers are typically disposed near the bottom of the body of water, it is expected that the airwave will have a material effect on the receiver measurements if the water depth is insufficient. FIG. 3 shows a synthetic transient electromagnetic response computed for a shallow water marine environment, consisting of a water layer and formations below the water layer. The response is shown in the graph of FIG. 3 as the time derivative of measured voltage after a step change in current from a 1 Ampere-meter dipole moment transmitter. In the simulation shown in FIG. 3, the simulated water layer is 100 m deep and has an electrical conductivity of 3.3 S/m. The simulated transmitter to receiver offset is 2 km and the simulated formations in the subsurface are represented by a 1 ohm-m resistivity (1 S/m conductivity) half space. The total response shown at 18 includes the response caused by the airwave, which response is decomposed into a separate curve shown at 16, and the response of the subsurface formations which is decomposed into a separate curve shown at 20. It can be observed that the airwave begins with a high amplitude, short duration peak and then decays with respect to time. The airwave still has substantial amplitude when the formation response begins, however. Because of the foregoing, the airwave can substantially affect the apparent response of the formations below the water layer. The airwave thus contaminates the portion of the transmitted electromagnetic that has travelled through the formations prior to detection, which portion contains information about the subsurface electrical resistivity that is of interest.

The present invention provides a method to substantially reduce the effect of the airwave in marine electromagnetic survey data, thereby enhancing detection of the signal of interest from the formations below the water bottom. The invention is based on the observation that in relatively shallow water, the water layer has a significant effect on the airwave.

Figure 4:
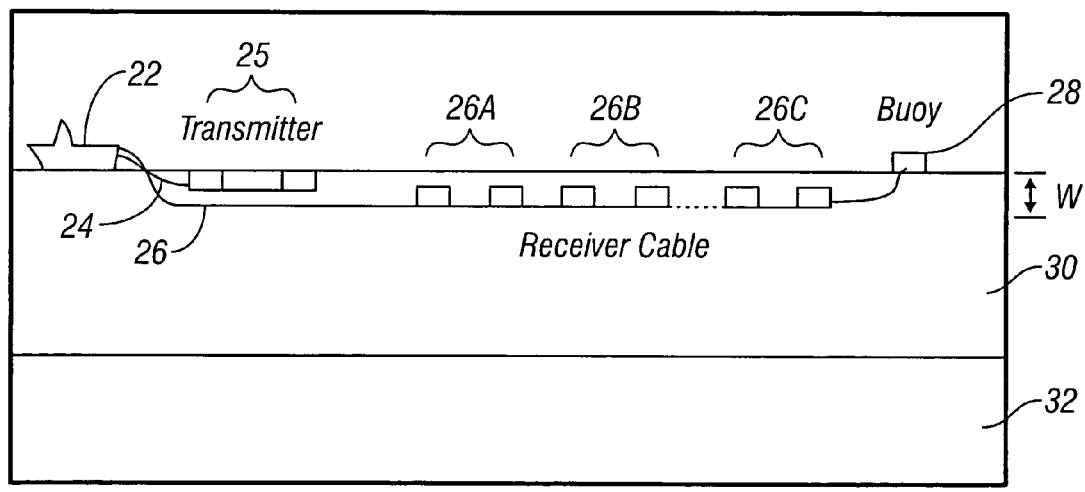
FIG. 4 shows an example of marine acquisition using a method according to the invention.

FIG. 4 shows an example marine electromagnetic survey system as it may be used in accordance with the invention. The system may include one or more survey vessels, one shown at 22, that tow an electromagnetic transmitter cable 24 in a body of water 30 such as a lake or the ocean. The same vessel 22 or a different vessel (not shown) may tow an electromagnetic receiver cable 26 in the water 30. The vessel 22 may include equipment (not shown separately) of types known in the art for actuating the transmitter cable 24 and detecting and recording signals from one or more receivers 26A on the receiver cable 26. The receiver cable 26 may be terminated with a tail buoy 28 having various navigation and signal processing devices thereon (not shown separately).

The transmitter on the transmitter cable 24 may be a pair of electrodes 25. One or more of the receivers on the receiver cable 26 may be a pair of electrodes, shown at 26A, 26B, 26C for each such pair. The use of electrode pairs to measure electric field response is not a limit on the scope of the invention. Other systems may use alternatively or additionally various magnetic field devices such as wire coils or loops to measure magnetic field response to the induced electromagnetic field.

Because water, particularly seawater, is a conductor of electricity, contact of the water with the electrodes 25 and 26A, 26B, 26C provides electrical coupling therefrom to the formations 32 below the water bottom. The transmitter signal may be merely by a step change in current applied across the transmitter electrodes 25, but may also be any transient-switched signal, including, for example, a pseudo-random binary sequence. The receivers 26A, 26B, 26C may measure potential difference, or, for example, the rate of change of the magnetic field stimulated by the transmitter signal. The recorded responses from the receivers 26A, 26B, 26C may be downloaded to the hard disk or other storage medium of a general purpose, programmable computer.

In order to facilitate airwave response separation from the formation response in the deconvolved signals, in the invention the transmitter and the receivers may be positioned at a selected depth level in the water shown by w, or less. w is typically a few meters. It is not necessary that the transmitter and receiver be at identical depths, but it is necessary that w not be large. When the transmitter and receiver are disposed at such depth below the water surface, the airwave is approximately equal to the response of the system of the air and the water to the depth w, and the subsurface response is the response of the system below the selected depth w. The value w is chosen so that the airwave impulse response can be readily separated from the total impulse response of the subsurface formations 32 and the water layer 30 below depth w for transmitter-receiver offset exceeding a few hundred meters.

To ensure that the airwave response can be separated from the formation/water layer response, the selected depth w should be small enough that substantially all of the airwave impulse response reaches the receiver before the beginning of the formation impulse response, and so is sufficiently separated in time to be easily removed from the formation response. The shallower the depth of the transmitter and receiver, the closer the foregoing approximation represents the actual system response, and the sharper and more separable the airwave becomes. By disposing the transmitter and receiver(s) on or near the sea surface, it is possible to obtain electromagnetic survey signals having such characteristics. After removal of the airwave, the remainder of the receiver response includes the response to the formations below the water bottom and it also includes the response to the water layer below the transmitter and receiver, which has a readily determinable electrical resistivity and depth. The resistivity variations in the formation below the water bottom may be determined by traditional electromagnetic inversion methods but including the known water layer in the calculation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring the electromagnetic response of formations below the bottom of a body of water, comprising:

positioning at least one electromagnetic transmitter and at least one electromagnetic receiver in the body water each at a selected depth below the water surface;
    conducting a transient electric current through the at least one transmitter;
    detecting an electromagnetic signal at the at least one electromagnetic receiver;
    wherein the depths are selected so that substantially all electromagnetic response to the current passed through the transmitter from the air above the body of water in the detected electromagnetic signal occurs before the beginning of a response originating in the formations below the water bottom.

2. A method as claimed in claim 1 wherein the at least one transmitter is an electric dipole.

3. A method as claimed in claim 1 wherein the transient electric current comprises a step change in current.

4. A method as claimed in claim 3 wherein the transient electric current comprises a pseudo-random binary sequence.

5. A method as claimed in claim 1 wherein the at least one receiver is an electric dipole.

6. A method as claimed in claim 1 further comprising estimating a response of the body of water and removing the water response from the detected electromagnetic signal.

7. A method as claimed in claim 6 wherein the water response is estimated by measuring a resistivity of the water and a depth of the body of water.

* * * * *